US010508049B2

(12) United States Patent
Melsert (10) Patent No.: US 10,508,049 B2
(45) Date of Patent: Dec. 17, 2019

(54) SYSTEM FOR REGENERATING SODIUM HYDROXIDE AND SULFURIC ACID FROM WASTE WATER STREAM CONTAINING SODIUM AND SULFATE IONS (71) Applicant: Tesla, Inc., Palo Alto, CA (US)

(72) Inventor: Ryan Mitchell Melsert, Reno, NV (US)

(73) Assignee: Tesla, Inc., Palo Alto, CA (US)

( * ) Notice: Subject to any disclaimer, the term of this patent is extended or adjusted under 35 U.S.C. 154(b) by 35 days.

(21) Appl. No.: 15/976,702

(22) Filed: May 10, 2018

(65) Prior Publication Data
US 2018/0327287 A1 Nov. 15, 2018

Related U.S. Application Data (60) Provisional application No. 62/504,968, filed on May 11, 2017.

(51) Int. Cl.
C02F 1/469 (2006.01)
C02F 1/461 (2006.01)
(Continued)

(52) U.S. Cl.
CPC ............ *C02F 1/4693* (2013.01); *B01D 61/44* (2013.01); *B01D 61/46* (2013.01); *B01D 61/54* (2013.01);
(Continued)

(58) Field of Classification Search
CPC .... C02F 1/4693; C02F 1/4695; C02F 1/4696; C02F 1/4698; C02F 1/46104; C02F 1/441;
(Continued)

(56) References Cited

U.S. PATENT DOCUMENTS 5,230,779 A † 7/1993 Martin
2015/0038750 A1 † 2/2015 Weiss

OTHER PUBLICATIONS

International Searching Authority; International Search Report and Written Opinion; International Application No. PCT/IB2018/053306; Jul. 6, 2018; 11 pgs.
(Continued)

Primary Examiner — Lessanework Seifu
(74) Attorney, Agent, or Firm — Knobbe, Martens, Olson & Bear, LLP (57) ABSTRACT A waste water treatment system including an electrolysis treatment system and three membrane concentration systems. The electrolysis treatment system includes a first chamber that receives waste water and produces treated waste water, a second chamber that receives first recycled water and produces dilute acid discharge, and a third chamber that receives second recycled water and produces dilute caustic discharge. An anion exchange membrane separates the first chamber from the second chamber. A cation exchange membrane separates the first chamber from the third chamber. The membrane concentration system receives the treated waste water and produces a concentrated aqueous sodium sulfate product and a pure water product. A first thermal concentration system receives the dilute acid discharge and produces first recycled water and a concentrated acid product. The second thermal concentration system receives the dilute caustic discharge and produces second recycled water and a concentrated aqueous sodium sulfate product.

20 Claims, 4 Drawing Sheets (51) Int. Cl.
  *C02F 1/44* (2006.01)
  *B01D 61/44* (2006.01)
  *B01D 61/46* (2006.01)
  *B01D 61/54* (2006.01)
  *B01D 61/58* (2006.01)
  *C02F 101/10* (2006.01)
  *B01D 61/02* (2006.01)
  *B01D 61/14* (2006.01)
  *C25B 1/14* (2006.01)
  *C25B 1/22* (2006.01)

(52) U.S. Cl.
  CPC .............. *B01D 61/58* (2013.01); *C02F 1/441* (2013.01); *C02F 1/46104* (2013.01); *B01D 61/02* (2013.01); *B01D 61/14* (2013.01); *B01D 2311/103* (2013.01); *B01D 2311/25* (2013.01); *C02F 1/445* (2013.01); *C02F 2101/101* (2013.01); *C02F 2201/46115* (2013.01); *C02F 2301/046* (2013.01); *C25B 1/14* (2013.01); *C25B 1/22* (2013.01)

(58) Field of Classification Search
  CPC ............ C02F 1/445; C02F 2201/46105; C02F 2201/46115; C02F 2201/46155; C02F 2201/46185; B01D 61/44; B01D 61/445; B01D 61/46; B01D 61/54; B01D 61/58; B01D 61/14; B01D 61/00; B01D 2311/105; B01D 2311/25; C25B 1/14; C25B 1/20; C25B 1/22
  See application file for complete search history.

(56) References Cited

OTHER PUBLICATIONS

Marti-Calatayud et al.; Sulfuric acid recovery from acid mine drainage by means of electrodialysis; Desalination; 9 Dec. 20, 2013; vol. 343; pp. 120-127.
Pisarska, et al.; Application of electro-electrodialysis for processing of sodium sulphate waste solutions containing organic compounds: Preliminary study; Journal of Cleaner Production; Oct. 19, 2016; pp. 3741-3747; vol. 142.
Turan et al, the behaviour of Nafion 424 membrane in the electrochemical production of lithium hydroxide, 2529-2538, Nov. 18, 2015, J Chem Technol Biotechnol, US.†
Velin, salt splitting process scale up, Nov. 1-16, 1999, Applied Electrochemistry for the New Millennium, US.†
O Brien et al, chapter 12 utilities of handbook of chlor-alkali technology, 1169-1216, 2005, Springer Science Business Media, US.†
Shreve, the chemical process industries, 376-383, 1956, McGraw-Hill Book Company, US.†
Jaroszek et al, comparison of the applicability of selected anion-exchange membranes for production of sulfuric acid by electro-electrodialysis , 223-227, Feb. 2017, Desalination Publications, US.†
O Brien et al, chapter 6 process overview of handbook of chlor-alkali technology, 443-464, 2005, Springer Science Business Media, US.†
Davis et al, a first course in ion permeable membranes, p. 14, 1997, The Electrochemical Consultancy, England.†
Boopathy et al, electrochemical treatment of reverse osmosis concentrate generated by the leather industry using a Cu-graphite electrode, 9971-9979, 2014, RSC Advances, US.†

† cited by third party

SYSTEM FOR REGENERATING SODIUM HYDROXIDE AND SULFURIC ACID FROM WASTE WATER STREAM CONTAINING SODIUM AND SULFATE IONS

CROSS-REFERENCE TO RELATED APPLICATION

The present U.S. Utility Patent Application claims priority pursuant to 35 U.S.C. § 119(e) to U.S. Provisional Application No. 62/504,968, entitled "SYSTEM FOR REGENERATING SODIUM HYDROXIDE AND SULFURIC ACID FROM WASTE WATER STREAM CONTAINING SODIUM AND SULFATE IONS", filed May 11, 2017, which is hereby incorporated herein by reference in its entirety and made part of the present U.S. Utility Patent Application for all purposes.

BACKGROUND

Technical Field

The present invention relates to water treatment; and more particularly to the treatment of waste water streams having ionic content.

Description of Related Art

Acid leaching that is performed through the addition of sulfuric acid, and neutralization through the addition of sodium hydroxide, are common processes used in manufacturing. Waste water containing high concentrations of sodium and sulfate ions is a product of these manufacturing processes. Because the sodium and sulfate ions are very soluble they are difficult to remove through conventional precipitation processes. Even if extracted from the waste water, solid sodium sulfate is a low value product and its disposal costs can be large. Without the removal of the sodium and sulfate ions from the waste water, the waste water cannot be reused. Disposal of large quantities of the waste water is expensive and can be harmful to the environment. Without reuse of the waste water, the cost of fresh water makeup can be very large. The cost of makeup sulfuric acid and sodium hydroxide for the leaching and neutralization processes can also be large. Thus, in order to address these cost and environmental issues, an improved process for the regeneration of sodium and sulfate ions in to sodium hydroxide and sulfuric acid from a waste water stream is needed.

SUMMARY

In order to overcome the shortcomings of the prior systems and methods among other shortcomings, a first embodiment of the present disclosure is directed to a waste water treatment system that includes an electrolysis treatment system, a membrane concentration system, a first thermal concentration system, and a second thermal concentration system. The electrolysis treatment system includes a first chamber having an inlet to receive waste water and an outlet to produce treated waste water, a second chamber having an inlet to receive first recycled water and an outlet to produce dilute acid discharge, and an anode contained in the second chamber. The electrolysis separation system further includes a third chamber having an inlet to receive second recycled water, an outlet to produce dilute caustic discharge, and a cathode contained therein. An anion exchange membrane (AEM) separates the first chamber from the second chamber and a cation exchange membrane (CEM) separates the first chamber from the third chamber.

The membrane concentration system has an inlet coupled to the outlet of the first chamber, a first outlet coupled to the inlet of the first chamber to produce a concentrated aqueous sodium sulfate product, and a second outlet to produce pure water product. The first thermal concentration system has an inlet coupled to the outlet of the second chamber, a first outlet coupled to the inlet of the second chamber producing the first recycled water, and a second outlet to produce a concentrated acid product. The second thermal concentration system has an inlet coupled to the outlet of the third chamber, a first outlet coupled to the inlet of the third chamber producing the second recycled water, and a second outlet to produce a concentrated aqueous sodium sulfate product.

A second embodiment of the present disclosure is directed towards the operation of a waste water treatment system. In a described embodiment, the waste water treatment system includes an electrolysis treatment system, a membrane concentration system, a first thermal concentration system, and a second thermal concentration system. Operations of the second embodiment include receiving waste water at an inlet of a first chamber, receiving first recycled water at an inlet of a second chamber, and receiving second recycled water at an inlet of a third chamber. Operations of the electrolysis treatment system also include migrating anions from the first chamber to the second chamber via an anion exchange membrane (AEM) separating the first chamber from the second chamber using an anode contained in the second chamber and migrating cations from the first chamber to the third chamber via a cation exchange membrane (CEM) separating the first chamber from the third chamber using a cathode contained in the third chamber. Operations of the electrolysis treatment system finally include producing treated waste water at an outlet of the first chamber, producing dilute acid discharge at an outlet of the second chamber, and producing dilute caustic discharge at an outlet of the third chamber.

Operations of the membrane concentration system include receiving the treated waste water from the outlet of the first chamber, producing saturated waste water, returning the saturated waste water to the inlet of the first chamber, and producing a pure water product. Operations of the first thermal concentration system include receiving the dilute acid discharge from the outlet of the second chamber, producing a concentrated acid product, producing the first recycled water, and returning the first recycled water to the inlet of the second chamber. Operations of a second thermal concentration system include receiving the dilute caustic discharge from the outlet of the third chamber, producing a concentrated aqueous sodium sulfate product, producing second recycled waste, and returning the second recycled water to the inlet of the third chamber.

The first and second embodiments of the present disclosure provide significant operational advantages as compared to the prior systems and methods, including resulting in large positive driving concentration gradients assisting electric voltage, as opposed to negative gradients resisting electric voltage in conventional systems, dramatically reducing electrical load. The waste water treatment system allows for the AEM and CEM of the electrolysis treatment system to be in contact with low concentration acid/caustic, significantly increasing their lifetimes. Further, the produced acid/caustic from the first and second thermal concentration systems are at much higher concentrations than the electrolysis treatment system could make on its own, increasing their value. Moreover, the exiting pure water product is Reverse Osmosis (RO) quality and can be directly used to service pure water needs. The recovery of both sodium and sulfate ions is near 100%, since there are almost no remaining ions in the exiting pure water product 224.

The first and second embodiments may include various optional aspects. With a first optional aspect, the waste water has a first ion content and the treated waste water has a second ion content that is less than the first ion content. According to a second optional aspect, the first outlet of the membrane concentration system produces ionic saturated water. According to a third optional aspect, the ionic saturated water comprises $Na+/SO_4^{2-}$ saturated water. According to a fourth optional aspect, the dilute acid discharge comprises less than 5 weight percent $SO_4^{2-}$. According to a fifth optional aspect, the dilute caustic discharge comprises less than 5 weight percent $Na^+$.

According to a sixth optional aspect, the concentrated acid product comprises between 15 wt % $SO_4^{2-}$ and 50 wt % $SO_4^{2-}$. According to a seventh optional aspect, the concentrated aqueous sodium sulfate product comprises between 15 wt % $Na^+$ and 50 wt % $Na^+$. According to an eighth optional aspect, at least one of the membrane concentration system, the first thermal concentration system, and the second thermal concentration system is an osmosis system. Finally, according to a ninth optional aspect, at least one of the membrane concentration system, the first thermal concentration system, and the second thermal concentration system is a concentration driven system.

DETAILED DESCRIPTION OF THE DISCLOSURE

Figure 1:
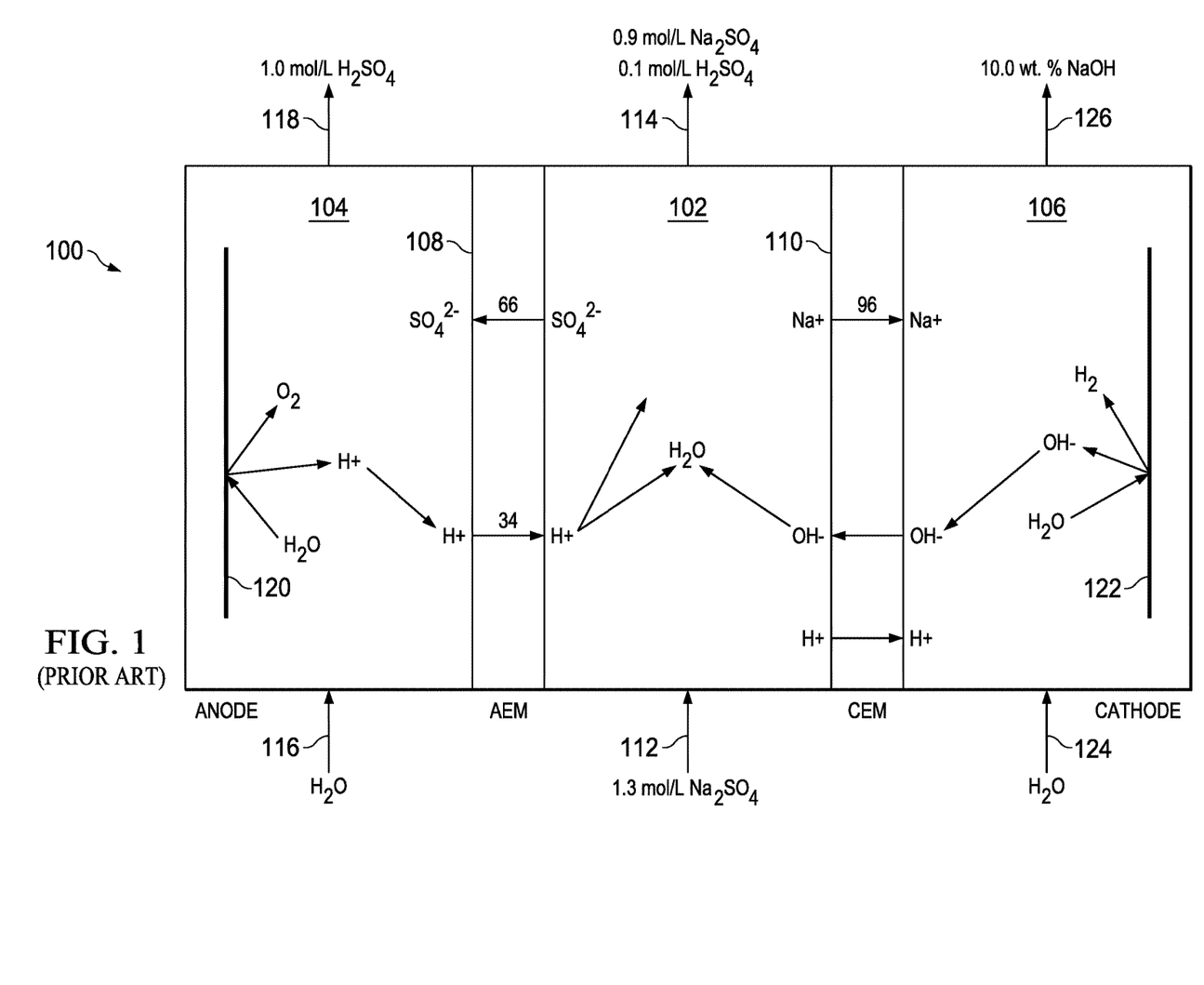
FIG. 1 illustrates a prior art system for treating a waste water stream having high concentrations of sodium and sulfate ions.

FIG. 1 illustrates a prior art system 100 for treating a waste water stream 112 having high concentrations of sodium ($Na^+$) and sulfate ($SO_4^{2-}$) ions. The system 100 of FIG. 1 includes three chambers 102, 104, and 106, each having an inlet and an outlet. The first chamber 102 and the second chamber 104 are separated by an anion exchange membrane (AEM) 108. The first chamber 102 and the third chamber 106 are separated by a cation exchange membrane (CEM) 110. Within the second chamber 104 is an anode 120. Within the third chamber 106 is a cathode 122. The anode 120 is positively charged and collects electrons emitted by the cathode 122 through electric attraction. This single unit cell of components can be configured into repeating unit cells in order to produce a larger system capable of higher throughput. In an alternate configuration, within these repeating unit cells, bipolar membranes can be implemented to create an electro dialytic cell to facilitate the dissociation of water.

Waste water 112 (having a high concentration of $Na^+$ and $SO_4^{2-}$) flows into the first chamber 102 and treated waste water 114 flows out of the first chamber 102. Pure water 116 flows into the second chamber 104 and low acid concentration (approximately 1.0 mol/L $H_2SO_4$) water 118 flows out of the second chamber 104. Pure water 124 flows into the third chamber 106 and low base concentration (approximately 10.0 wt. % NaOH) water 126 flows out of the third chamber 106. Pumps, piping, and openings that cause the flow of liquids through the chambers 102, 104, and 106 are not illustrated in FIG. 1 but are generally known.

The system 100 operates with the anode 120 and cathode 122 energized to create an electric field that causes flow of charged ions between the first chamber 102 and the second chamber 104 via the AEM 108 and the flow of charged ions between the first chamber 102 and the third chamber 106 via the CEM 110. With the system 100 of FIG. 1, $SO_4^{2-}$ ions flow from the first chamber 102 to the second chamber 104 via the AEM 108 and $H^+$ ions flow from the second chamber 104 to the first chamber 102 via the AEM 108. Further, with the system 100 of FIG. 1, $Na^+$ ions and $H^+$ ions flow from the first chamber 102 to the third chamber 106 via the CEM 110 and $OH^-$ ions flow from the third chamber 106 to the first chamber 102 via the CEM 110. As shown, the waste water stream 112 has a nominal concentration of 1.3 mol/L $Na_2SO_4$ and the treated wastewater stream 114 has a nominal concentration of 0.9 mol/L $Na_2SO_4$ and 0.1 mol/L $H_2SO_4$.

With the operation of the prior art system 100 of FIG. 1, the applied electric field between the anode 120 and the cathode 122 pulls the sulfate ions through the AEM 108, where they join with $H^+$ ions generated by the splitting of water at the anode 120 electrode surface, to produce dissolved sulfuric acid (1.0 mol/L $H_2SO_4$). The sodium ions are pulled the opposite direction through the CEM 110 where they join with hydroxyl ions generated by the splitting of water at the cathode 122 electrode surface to produce dissolved sodium hydroxide (10 wt. % NaOH).

With the prior art system 100 of FIG. 1, not all of the sodium and sulfate ions are able to be removed from the waste water feed stream to produce the "treated" water. This reduces recovery of acid/caustic, and also presents challenges when trying to reuse the "treated" water. This process becomes increasingly difficult as the concentration of ions in the waste water feed stream lowers as it moves through the electrolysis treatment system, and an increasing amount of electrical voltage needs to be applied. Further, the generated acid/caustic products can only be produced at low concentrations. As the product streams increase in concentration, an increasing amount of electrical voltage is needed between the anode 120 and the cathode 122. Further, as the membranes AEM 108 and CEM 110 are in contact with these higher concentration acid/caustic products, the lifetime of the membranes 108 and 110 decreases. The combination of a high electrical load, low recovery efficiency, low recovered acid/caustic concentrations, and short component lifetimes make the prior art system 100 economically unviable.

Figure 2:
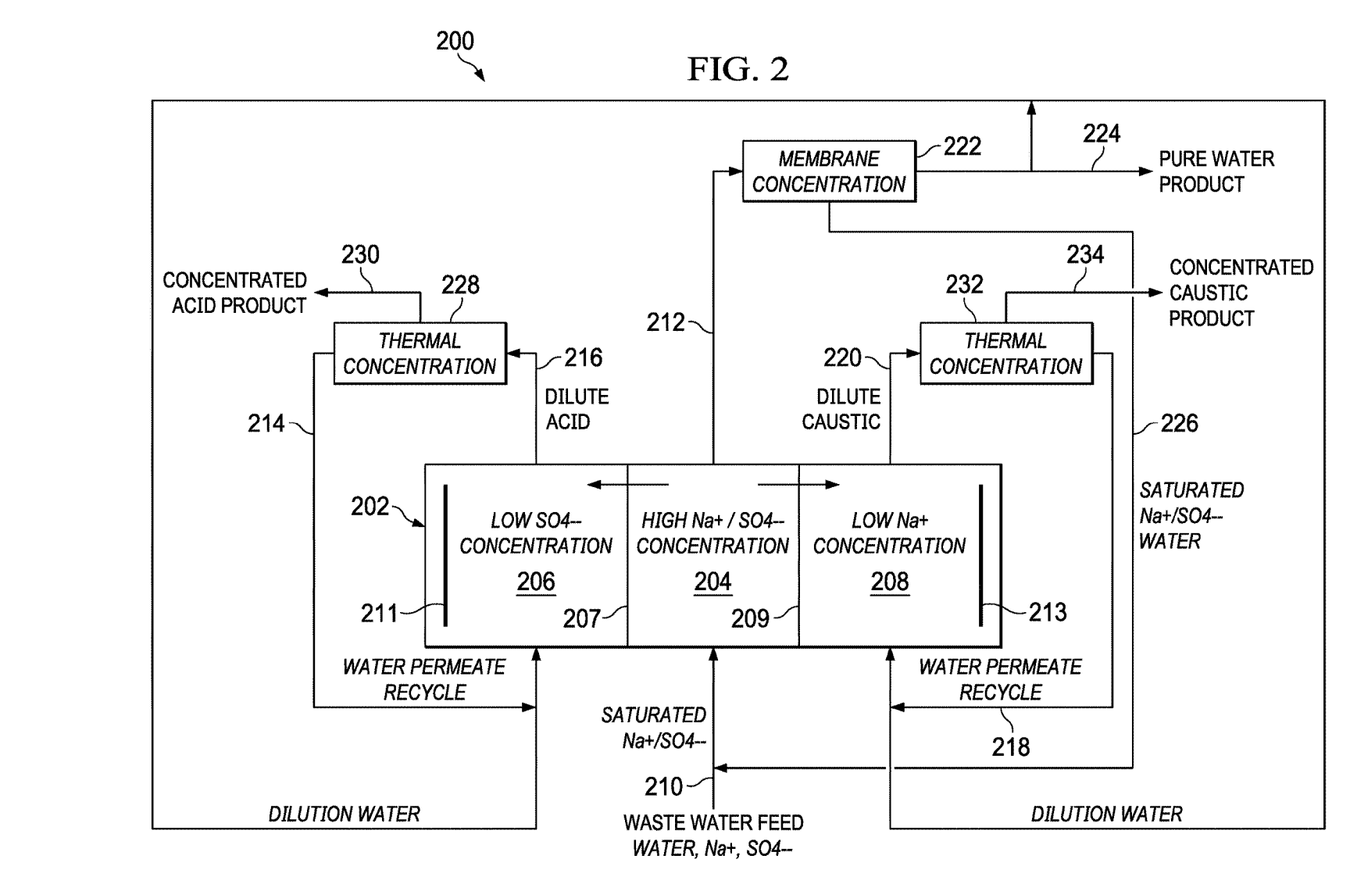
FIG. 2 illustrates a waste water treatment system for treating a waste water stream having high concentrations of sodium and sulfate ions according to a disclosed embodiment of the present disclosure.

FIG. 2 illustrates a waste water treatment system 200 for treating a waste water stream 210 having high concentrations of sodium and sulfate ions according to a disclosed embodiment of the present disclosure. The waste water treatment system 200 includes an electrolysis treatment system 202 having a first chamber 204, a second chamber 206 and a third chamber 208. The first chamber 204 has an inlet to receive the waste water 210 and an outlet to produce treated waste water 212. The second chamber 206 has an inlet to receive pure water 214 and an outlet to produce dilute acid discharge 216. Contained within the second chamber 206 is an anode 211. The third chamber 208 has an inlet to receive pure water 218 and an outlet to produce dilute caustic discharge 220. Contained within the third chamber 208 is a cathode 213. The electrolysis treatment system 202 further includes an anion exchange membrane (AEM) 207 separating the first chamber 204 from the second chamber 206 and a cation exchange membrane (CEM) 209 separating the first chamber 204 from the third chamber 208. This single unit cell of components can be configured in to repeating unit cells in order to produce a larger system capable of higher throughput. In an alternate configuration, within these repeating unit cells, bipolar membranes can be implemented to create an electro dialytic cell to facilitate the dissociation of water.

The waste water treatment system 200 further includes a membrane concentration system 222 having an inlet coupled to the outlet of the first chamber 204 that receives the treated waste water 212, a first outlet that produces ion saturated water 226 coupled to the inlet of the first chamber 204, and a second outlet that produces pure water product 224. The waste water treatment system 200 further includes a first thermal concentration system 228 having an inlet coupled to the outlet of the second chamber 206 to receive the dilute acid discharge 216, a first outlet coupled to the inlet of the second chamber 206 that produces pure water 214, and a second outlet to produce a concentrated acid product 230. Further, the waste water treatment system 200 includes a second thermal concentration system 232 having an inlet coupled to the outlet of the third chamber 208 to receive the dilute caustic discharge 220, a first outlet coupled to the inlet of the third chamber 208 to produce pure water 218, and a second outlet to produce a concentrated aqueous sodium sulfate product 234. Membranes of the first 222, second 228, and third 232 membrane concentration systems are selected to produce their respective products. These membrane concentration systems may be any pressure driven systems, concentration driven systems, electrical potential gradient systems, and/or temperature gradient systems. Examples of pressure driven systems include microfiltration systems, ultrafiltration systems, nanofiltration systems, and reverse osmosis systems. Examples of concentration driven systems are pervaporation systems and forward osmosis systems. Examples of electrical potential gradient systems includes membrane electrolysis systems, electro deionization systems, and electro filtration systems. Temperature gradient systems may include membrane distillation systems.

Various operating characteristics, inputs, and outputs are supported by one or more structures and operations of the water treatment system 200. These options may be combined in any number of ways. With the waste water treatment system 200, the waste water 210 has a first ion content and the treated waste water 212 has a second ion content that is less than the first ion content. The first outlet of the first membrane concentration system 222 produces ionic saturated water that may be $Na^+/SO_4^{2-}$ saturated water. The waste water treatment system 200 dilute acid discharge 216 may be a solution having less than 5 weight percent $SO_4^{2-}$. The dilute caustic discharge 220 may be a solution having less than 5 weight percent $Na^+$. The concentrated acid product 230 may be a solution of between 15 wt % $SO_4^{2-}$ and 50 wt % $SO_4^{2-}$. Further, the concentrated aqueous sodium sulfate product 234 may be a solution of between 15 wt % $Na^+$ and 50 wt % $Na^+$.

As compared to prior waste water treatment systems, the waste water treatment system 200 of the present disclosure, instead of pulling low concentration ions in the feed to high concentration ions in the product chambers 206 and 208, uses the three dedicated membrane concentration systems 222, 228, and 232 to maintain high ion concentrations in the feed and low ion concentrations in the product chambers 206 and 208. The first thermal concentration system 228 takes in the dilute acid 216 produced by the electrolysis treatment system 202 that allows pure water 214 to permeate while the dissolved acid species 230 are rejected. The pure water 214 is recycled back to the second chamber 206 of the electrolysis treatment system 202 to dilute this stream, while the reject concentrated acid 230 is extracted as a product. The second thermal concentration system 232 takes in the dilute caustic 220 produced by the electrolysis treatment system 202 and allows pure water 218 to permeate while the dissolved caustic species 234 are rejected. The pure water 218 is recycled back to the third chamber 208 of the electrolysis treatment system 202 to dilute this stream, while the reject concentrated caustic 234 is extracted as a product. The membrane concentration system 222 takes in the exiting waste water 212 that still contains significant dissolved sodium and sulfate. Pure water 224 is extracted as a product, and the concentrate reject 226 is sent back to the electrolysis treatment system 202 waste water feed 210 to maintain a high concentration of sodium and sulfate ions in the waste water feed 210.

The waste water treatment system 200 of the present disclosure has significant operational advantages, including resulting in large positive driving concentration gradient assisting electric voltage, as opposed to negative gradient resisting electric voltage in conventional system, dramatically reducing electrical load. The waste water treatment system 200 allows for the AEM and CEM of the electrolysis treatment system to be in contact with low concentration acid/caustic, significantly increasing their lifetimes. Further, the produced acid/caustic from the membrane concentration systems 228 and 232 are at much higher concentrations than the electrolysis treatment system 202 could make on its own, increasing their value. Moreover, the exiting pure water product 224 is Reverse Osmosis (RO) quality and can be directly used to service pure water needs. The recovery of both sodium and sulfate ions is near 100%, since there are almost no remaining ions in the exiting pure water product 224.

FIGS. 3, 4, 5, and 6 illustrate operations of a water treatment system according to one or more disclosed embodiments of the present invention. The operations described in these FIGs. may be performed concurrently in some embodiments and consecutively in other embodiments. Further, some of these operations may be performed concurrently while other of the operations may be performed consecutively. One particular embodiment of these operations supports the structure of FIG. 2.

Figure 3:
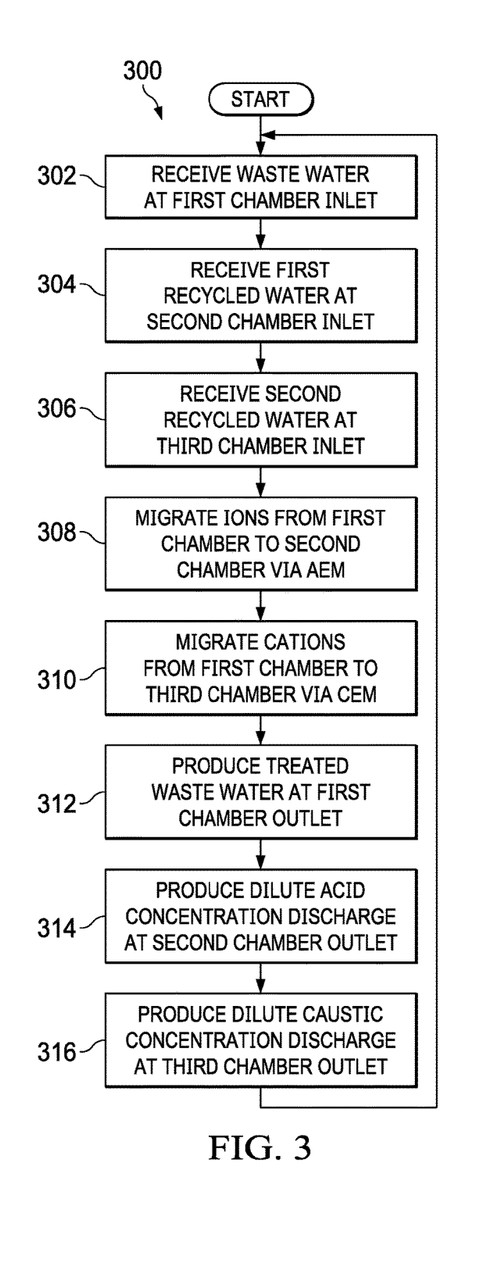
FIG. 3 is a flow chart illustrating operations of an electrolysis treatment system of a waste water treatment system according to a disclosed embodiment of the present disclosure.

FIG. 3 is a flow chart illustrating operations of an electrolysis treatment system of a waste water treatment system according to a disclosed embodiment of the present disclosure. Operations 300 commence with receiving waste water at an inlet of a first chamber (step 302), receiving first recycled water at an inlet of a second chamber (step 304), and receiving second recycled water at an inlet of a third chamber (step 306). Operations 300 continue with migrating anions from the first chamber to the second chamber via an anion exchange membrane (AEM) separating the first chamber from the second chamber using an anode contained in the second chamber (step 308) and migrating cations from the first chamber to the third chamber via a cation exchange membrane (CEM) separating the first chamber from the third chamber using a cathode contained in the third chamber (step 310). Operations 300 continue with producing treated waste water at an outlet of the first chamber (step 312), producing dilute acid discharge at an outlet of the second chamber (step 314), and producing dilute caustic discharge at an outlet of the third chamber (step 316). From step 316, operations return to step 302. The steps of the operations 300 of FIG. 3 are performed in parallel in some embodiments.

Figure 4:
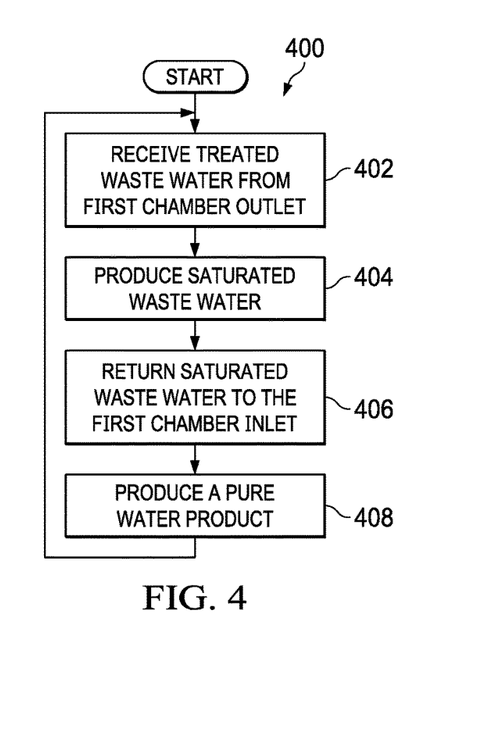
FIG. 4 is a flow chart illustrating operations of a first membrane concentration system of the waste water treatment system according to a disclosed embodiment of the present disclosure.

FIG. 4 is a flow chart illustrating operations of a first membrane concentration system of the waste water treatment system according to a disclosed embodiment of the present disclosure. As previously described, the operations 400 of FIG. 4 may be performed concurrently with the operations 300 of FIG. 3. Operations 400 begin with receiving the treated waste water from the outlet of the first chamber (step 402). Operations 400 continue with producing saturated waste water (step 404), returning the saturated waste water to the inlet of the first chamber (step 406) and producing a pure water product (step 408). From step 408, operations return to step 402. The steps of the operations 400 of FIG. 4 are performed in parallel in some embodiments.

Figure 5:
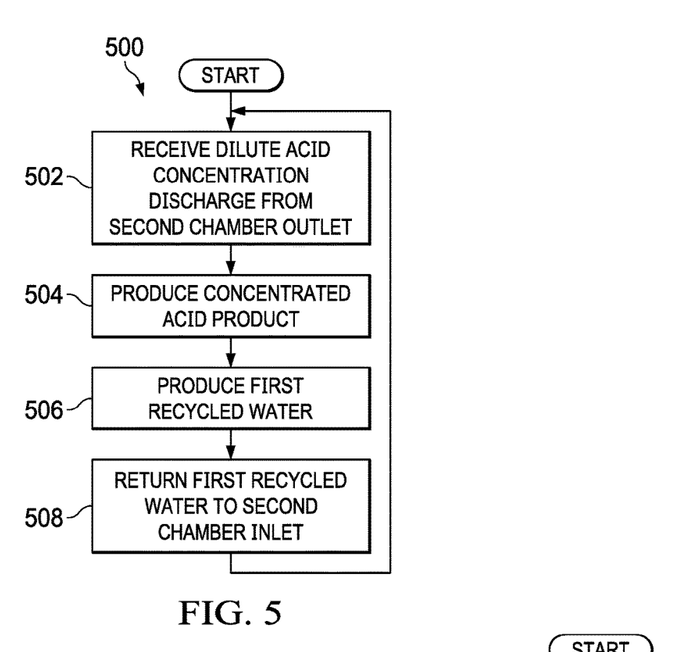
FIG. 5 is a flow chart illustrating operations of a first thermal concentration system of the waste water treatment system according to a disclosed embodiment of the present disclosure.

FIG. 5 is a flow chart illustrating operations of a first thermal concentration system of the waste water treatment system according to a disclosed embodiment of the present disclosure. Operations 500 begin with receiving the dilute acid discharge from the outlet of the second chamber (step 502) and continue with producing a concentrated acid product (step 504), producing the first recycled water (step 506), and returning the first recycled water to the inlet of the second chamber (step 508). From step 508, operations return to step 502. The steps of the operations 500 of FIG. 5 are performed in parallel in some embodiments.

Figure 6:
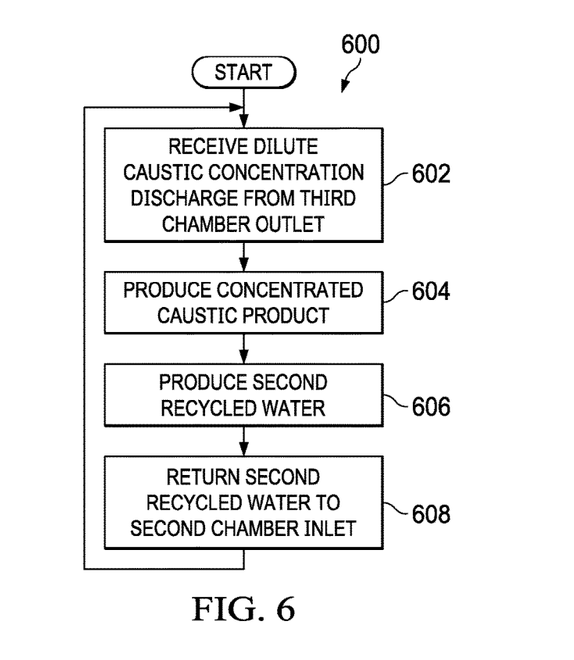
FIG. 6 is a flow chart illustrating operations of a second thermal concentration system of the waste water treatment system according to a disclosed embodiment of the present disclosure.

FIG. 6 is a flow chart illustrating operations of a second thermal concentration system of the waste water treatment system according to a disclosed embodiment of the present disclosure. Operations 600 begin with receiving the dilute caustic discharge from the outlet of the third chamber (step 602). Operations continue with producing a concentrated aqueous sodium sulfate product (step 604), producing second recycled water (step 606), and returning the second recycled water to the inlet of the third chamber (step 608). From step 608, operations return to step 602. The steps of the operations 600 of FIG. 6 are performed in parallel in some embodiments.

The operations 300, 400, 500 and 600 of FIGS. 3 through 6 may include various optional aspects. With a first optional aspect, the waste water has a first ion content and the treated waste water has a second ion content that is less than the first ion content. According to a second optional aspect, the first outlet of the membrane concentration system produces ionic saturated water. According to a third optional aspect, the ionic saturated water comprises $Na+/SO_4^{2-}$ saturated water. According to a fourth optional aspect, the dilute acid discharge comprises less than 5 weight percent $SO_4^{2-}$. According to a fifth optional aspect, the dilute caustic discharge comprises less than 5 weight percent $Na^+$.

According to a sixth optional aspect, the concentrated acid product comprises between 15 wt % $SO_4^{2-}$ and 50 wt % $SO_4^{2-}$. According to a seventh optional aspect, the concentrated aqueous sodium sulfate product comprises between 15 wt % $Na^+$ and 50 wt % $Na^+$. According to an eighth optional aspect, at least one of the membrane concentration system, the first thermal concentration system, and the second thermal concentration system is an osmosis system. Finally, according to a ninth optional aspect, at least one of the membrane concentration system, the first thermal concentration system, and the second thermal concentration system is a concentration driven system.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

What is claimed is:
1. A waste water treatment system comprising:
   an electrolysis treatment system having:
      a first chamber having an inlet to receive waste water and an outlet to produce treated waste water;
      a second chamber having an inlet to receive first recycled water and an outlet to produce dilute acid discharge;
      an anode contained in the second chamber;
      a third chamber having an inlet to receive second recycled water and an outlet to produce dilute caustic discharge;
      a cathode contained in the third chamber;

an anion exchange membrane (AEM) separating the first chamber from the second chamber; and
a cation exchange membrane (CEM) separating the first chamber from the third chamber;
a membrane concentration system having an inlet coupled to the outlet of the first chamber, a first outlet coupled to the inlet of the first chamber to produce a concentrated aqueous sodium sulfate product, and a second outlet to produce pure water product;
a first thermal concentration system having an inlet coupled to the outlet of the second chamber, a first outlet coupled to the inlet of the second chamber and producing the first recycled water, and a second outlet to produce a concentrated acid product; and
a second thermal concentration system having an inlet coupled to the outlet of the third chamber, a first outlet coupled to the inlet of the third chamber and producing the second recycled water, and a second outlet to produce a concentrated aqueous sodium sulfate product.

2. The waste water treatment system of claim 1, wherein the waste water has a first ion content and the treated waste water has a second ion content that is less than the first ion content.

3. The waste water treatment system of claim 1, wherein the first outlet of the membrane concentration system produces ionic saturated water.

4. The waste water treatment system of claim 3, wherein the ionic saturated water comprises $Na^+/SO_4^{2-}$ saturated water.

5. The waste water treatment system of claim 1, wherein the dilute acid discharge comprises less than 5 weight percent $SO_4^{2-}$.

6. The waste water treatment system of claim 1, wherein the dilute caustic discharge comprises less than 5 weight percent $Na^+$.

7. The waste water treatment system of claim 1, wherein the concentrated acid product comprises between 15 wt % $SO_4^{2-}$ and 50 wt % $SO_4^{2-}$.

8. The waste water treatment system of claim 1, wherein the concentrated aqueous sodium sulfate product comprises between 15 wt % $Na^+$ and 50 wt % $Na^+$.

9. The waste water treatment system of claim 1, wherein at least one of the membrane concentration system, the first thermal concentration system, and the second thermal concentration system is an osmosis system.

10. The waste water treatment system of claim 1, wherein at least one of the membrane concentration system, the first thermal concentration system, and the second thermal concentration system is a concentration driven system.

11. A method for treating waste water comprising:
by an electrolysis treatment system:
receiving waste water at an inlet of a first chamber;
receiving first recycled water at an inlet of a second chamber;
receiving second recycled water at an inlet of a third chamber;
migrating anions from the first chamber to the second chamber via an anion exchange membrane (AEM) separating the first chamber from the second chamber using an anode contained in the second chamber;
migrating cations from the first chamber to the third chamber via a cation exchange membrane (CEM) separating the first chamber from the third chamber using a cathode contained in the third chamber;
producing treated waste water at an outlet of the first chamber;
producing dilute acid discharge at an outlet of the second chamber; and
producing dilute caustic discharge at an outlet of the third chamber;
by a membrane concentration system:
receiving the treated waste water from the outlet of the first chamber;
producing saturated waste water;
returning the saturated waste water to the inlet of the first chamber; and
producing a pure water product;
by a first thermal concentration system:
receiving the dilute acid discharge from the outlet of the second chamber;
producing a concentrated acid product;
producing the first recycled water; and
returning the first recycled water to the inlet of the second chamber; and
by a second thermal concentration system:
receiving the dilute caustic discharge from the outlet of the third chamber;
producing a concentrated aqueous sodium sulfate product;
producing the second recycled water; and
returning the second recycled water to the inlet of the third chamber.

12. The method of claim 11, wherein the waste water has a first ion content and the treated waste water has a second ion content that is less than the first ion content.

13. The method of claim 11, wherein the membrane concentration system produces ionic saturated water.

14. The method of claim 13, wherein the ionic saturated water comprises $Na^+/SO_4^{2-}$ saturated water.

15. The method of claim 11, wherein the dilute acid discharge comprises less than 5 weight percent $SO_4^{2-}$.

16. The method of claim 11, wherein the dilute caustic discharge comprises less than 5 weight percent $Na^+$.

17. The method of claim 11, wherein the concentrated acid product comprises between 15 wt % $SO_4^{2-}$ and 50 wt % $SO_4^{2-}$.

18. The method of claim 11, wherein the concentrated aqueous sodium sulfate product comprises between 15 wt % $Na^+$ and 50 wt % $Na^+$.

19. The method of claim 11, wherein at least one of the membrane concentration system, the first thermal concentration system, and the second thermal concentration system is an osmosis system.

20. The method of claim 11, wherein at least one of the membrane concentration system, the first thermal concentration system, and the second thermal concentration system is a concentration driven system.

* * * * *